United States Patent [19]

Tsukimoto et al.

[11] Patent Number: 5,646,469
[45] Date of Patent: Jul. 8, 1997

[54] VIBRATION DRIVEN MOTOR INCLUDING A VIBRATION MEMBER HAVING AN ELASTIC CONTACT PORTION AND A CONTACT MEMBER HAVING AN ELASTIC CONTACT PORTION

[75] Inventors: Takayuki Tsukimoto, Fujisawa; Shinichi Koreeda; Nobuyuki Kojima, both of Kawasaki; Mitsuo Nishimura, Tokyo, all of Japan

[73] Assignee: Canon Kabushiki Kaisha, Tokyo, Japan

[21] Appl. No.: 534,294

[22] Filed: Sep. 27, 1995

Related U.S. Application Data

[63] Continuation of Ser. No. 155,860, Nov. 23, 1993, abandoned.

[30] Foreign Application Priority Data

Dec. 3, 1992 [JP] Japan ................................ 4-324236

[51] Int. Cl.⁶ ................................................ H02N 2/10
[52] U.S. Cl. ........................................................ 310/323
[58] Field of Search ................................ 310/323, 328

[56] References Cited

U.S. PATENT DOCUMENTS

| | | | |
|---|---|---|---|
| 4,210,837 | 7/1980 | Vasiliev et al. | 310/323 |
| 4,692,650 | 9/1987 | Okumura et al. | 310/323 |
| 4,692,651 | 9/1987 | Hiramatsu et al. | 310/323 |
| 4,831,305 | 5/1989 | Mukohjima et al. | 310/323 |
| 4,914,338 | 4/1990 | Kurakami | 310/323 |
| 5,028,833 | 7/1991 | Kawai | 310/323 |
| 5,043,956 | 8/1991 | Tsukada et al. | 310/323 |
| 5,091,670 | 2/1992 | Kawata et al. | 310/323 |
| 5,148,075 | 9/1992 | Shirasaki | 310/323 |
| 5,164,629 | 11/1992 | Nakanishi | 310/323 |
| 5,231,325 | 7/1993 | Tamai et al. | 310/323 |
| 5,274,295 | 12/1993 | Tsukimoto et al. | 310/323 |
| 5,428,260 | 6/1995 | Suzuki | 310/323 |
| 5,436,522 | 7/1995 | Tsukimoto et al. | 310/323 |

FOREIGN PATENT DOCUMENTS

| | | | |
|---|---|---|---|
| 0404511 | 12/1990 | European Pat. Off. | 310/323 |
| 0473423 | 3/1992 | European Pat. Off. | H01L 41/09 |
| 0469881 | 5/1992 | European Pat. Off. | H01L 41/09 |
| 0553827 | 8/1993 | European Pat. Off. | H01L 41/09 |
| 0238473 | 9/1989 | Japan | 310/323 |

OTHER PUBLICATIONS

European Search Report.

*Primary Examiner*—Thomas M. Dougherty
*Attorney, Agent, or Firm*—Fitzpatrick, Cella, Harper & Scinto

[57] ABSTRACT

A vibration driven motor including a vibration member for generating a vibration therein as a driving force, and a contact member in press contact with the vibration member, wherein a vibration generated in the vibration member causes relative movement between the vibration member and the contact member. The vibration member includes an elastic contact portion, and the contact member includes an elastic contact portion in contact with the contact portion of the vibration member.

14 Claims, 10 Drawing Sheets

5,646,469

VIBRATION DRIVEN MOTOR INCLUDING A VIBRATION MEMBER HAVING AN ELASTIC CONTACT PORTION AND A CONTACT MEMBER HAVING AN ELASTIC CONTACT PORTION

This application is a continuation of application Ser. No. 08/155,860 filed Nov. 23, 1993 now abandoned.

BACKGROUND OF THE INVENTION

1. Field of the Invention

The present invention relates to an ultrasonic vibration driven motor including a bar-shaped vibration member and a movable body press-contacted to the vibration member. Electric energy is supplied to an electric-mechanical energy converting element provided on the bar-shaped vibration member, such that surface portions of the vibration member achieve circular or elliptical motions. In this manner, the movable body press-contacted to the vibration member is friction-driven, thus generating motor output. Such an ultrasonic vibration driven motor achieves quiet operation and is highly responsive. Therefore, it has particular utility when used to operate a camera lens system, and further may be used in a wider variety of fields and apparatuses, such as information processing apparatuses.

2. Description of the Related Art

FIG. 2 illustrates a stack arrangement of piezoelectric elements and an electric polarization pattern of the piezoelectric elements used in a bar-shaped ultrasonic vibration driven motor (hereinafter, referred to as "bar-shaped vibration driven motor"). As indicated in FIG. 2, each piezoelectric element is divided into halves by a portion located at a center line, and the two halves are oppositely polarized.

The five piezoelectric elements consist of two A-phase elements, two B-phase elements and one S-phase element. The A-phase and B-phase piezoelectric elements are arranged so as to have a 90° phase difference. The S-phase piezoelectric element is disposed at the bottom of the stack and is used to detect a resonance vibration. Although not shown in FIG. 2, when assembled, electrode plates are inserted between the piezoelectric elements.

Operation of the bar-shaped vibration driven motor will be described with reference to FIG. 3.

When only the A-phase piezoelectric elements are supplied with AC voltage, they repeatedly contract and expand and, thus, a vibration member 1 comprising vibration member components 1c, 1d achieves a primary bending principal vibration in a right-left direction (as shown in FIG. 3). Similarly, when only the B-phase piezoelectric elements are supplied with AC voltage, the vibration member 1 vibrates in a plane perpendicular to the plane of the sheet. If the vibration by the A-phase and the vibration by the B-phase are provided with a 90° phase difference, then the vibration member 1 achieves clockwise or counterclockwise circular motion about the lengthwise axis of the vibration member.

The vibration member 1 has a circumferential groove 1a for enhancing displacement caused by the vibration, such that the end portion of the vibration member oscillates in a circular motion, as indicated in FIG. 3. When viewed from above the contact surface (the top surface of the vibration member 1), this oscillating vibration is regarded as a single-wave progressive wave. If a rotor 2 having a contact spring portion is press-contacted to the vibration member 1 at the top end thereof, then the rotor contacts a portion on the top end corresponding to the crest of the progressive wave, and is thereby driven to rotate in a direction opposite the direction of the circular oscillation of the vibration member 1. A drive output is extracted by a gear 4 provided around a ball bearing 3 which is provided at an upper portion of the rotor 2.

In general, a bar-shaped vibration driven motor is designed on the basis of the FEM analysis of the characteristic mode of a combined assembly of the vibration member 1, a supporting pin shaft 5 (the shaft end) and a flange portion 6, so as to reduce the vibration amplitude of the flange portion 6. Therefore, bar-shaped vibration driven motors experience considerably less supporting loss, compared with ring-shaped vibration driven motors.

A rotor contact spring 7 is formed in a lower portion of a rotor main ring 2a of the rotor 2 of the bar-shaped motor driven motor. The shape of the rotor contact spring 7 provides elasticity. Also, like the rotor contact spring of a ring-shaped vibration driven motor, the rotor contact spring 7 of the bar-shaped vibration motor is designed to have a natural frequency substantially higher than the excitation frequency of the vibration member 1, and thereby follows the vibration. Further, the rotor main ring 2a has a large inertial mass and, therefore, remains unexcited even when the vibration member 1 is excited.

Advantages of a vibration driven motor include a small-size body and a large torque output. Also, a vibration driven motor normally requires no speed-reducing gear or, if such a gear is required, then it generally requires only a small speed reduction ratio. Therefore, such a motor has particular utility in a small-size apparatus that must achieve quiet operation. However, in such applications, further size reduction and torque enhancement in vibration driven motors are desired.

To achieve a large torque output, it is desirable to provide the rotor and the vibration member with large vibration diameters.

Further, to output a large torque, the contact pressure may be increased. However, because the component parts of the rotor supporting system and the like are inevitably made smaller and thinner as a result of the size reduction of the motor, a large contact pressure between the rotor and the vibration member is likely to deform such component parts. The deformation of such component parts will result in degradation of the performance of the motor, for example, fluctuation of the contact pressure therebetween. In addition, an increase in the contact pressure may well reduce the service life of the bearing.

Therefore, to achieve both size reduction and torque enhancement, it is preferable that the contact portion of the rotor be adjacent to the outermost periphery of the rotor.

To reduce sliding loss, the rotor contact spring 7 must be designed to substantially prevent undesired slippage, that is, any slippage unnecessary for driving.

Part of such undesired slippage is radial slippage. As shown in FIG. 4, the vibration member 1 exhibits, at a rotor contacting portion, a displacement $\Delta z$ in the axial direction, and a displacement $\Delta r$ in the radial direction.

In a conventional vibration driven motor, a contact spring 7 provided on the rotor 2 is formed in the shape of a letter "L", as shown in FIG. 5. The "L"-shaped contact spring 7 pivotably bends substantially about a point $A_0$, so as to achieve displacements $\Delta z$ and $\Delta r$ of the contact portion $P_0$, thus preventing radial slippage.

However, because the contact portion is positioned at a location radially inward from the outermost periphery of the rotor 2, this construction has a drawback in that reduction of the diameter of the rotor 2 may be limited.

To overcome this drawback, a rotor contact spring 7 may extend outward from the rotor main ring 2a, as shown in FIG. 6. However, because the direction of the pivotable bending of the contact spring 7 about a point $A_1$, more specifically, the direction of the displacement of the contact point $P_1$, differs greatly from the direction of the displacement of the vibration member, it is difficult in this construction to provide a contact spring which prevents radial slippage and has a suitable spring hardness with respect to the axial direction.

A construction as shown in FIG. 7 has been proposed, in which a vibration member has a contact spring 1b. This construction facilitates achieving the coincidence of the displacing direction of the contact portion including a peripheral point $P_2$, which pivotably moves about a point $A_2$, with the displacing direction of the vibration member, thereby eliminating radial slippage.

However, this construction has drawbacks as follows.

The contact spring 1b smoothly contacts the vibration member if a peripheral point, for example, the point $P_2$, on the contact spring 1b is displaced as indicated by the graph in FIG. 8, where fr is the driving frequency. To achieve such displacement, the contact spring 1b must be responsive to a frequency at least twice the motor driving frequency and, preferably, an even higher frequency.

For the sake of size reduction, the vibration member preferably has a reduced axial length. However, a reduction in the axial length increases the driving frequency. Therefore, in order to maintain a low-speed rotation of the vibration driven motor, which is one of the features thereof, despite the reduced axial length, the amplitude must be restricted to a small range, resulting in strict tolerance requirements in machining conditions, such as surface precision.

To reduce the characteristic frequency of the vibration member and, thereby, to curb the above-stated drawbacks, a material which transmits sound at a low speed, for example, brass, is conventionally used for a vibration member including a contact spring. However, such a material degrades the frequency responsiveness of the contact spring, and thus fails to achieve smooth contact with the rotor. FIG. 9 shows the displacement pattern of a contact point P2 on the contact spring, which is experimentally determined. The displacement pattern is significantly different from the desirable pattern shown in FIG. 8. The pattern shown in FIG. 9 indicates that the rotor jumps and produces sounds during operation.

To overcome this drawback, a conventional contact spring is formed of a material which transmits sound at a high speed. However, if a contact spring 1b formed of a fast sound transmission material, such as aluminium, is connected to a vibration member 1 as shown in FIG. 10, then the vibration is considerably damped at the connecting portion. Therefore, this construction suffers deterioration in motor efficiency as well as an increase in production cost. In another conventional construction as shown in FIG. 7, aluminium or the like is used to form a component 1c of the vibration member 1. However, in this construction, because the driving frequency of the vibration member is increased, the required frequency responsiveness of the contact spring becomes severe and therefore difficult to achieve. Therefore, this construction fails to achieve substantial improvements or advantages.

SUMMARY OF THE INVENTION

An object of the present invention is to provide a vibration driven motor which solves the above-stated problems of the conventional art.

Another object of the invention is to provide a quiet camera system employing a vibration driven motor.

Accordingly, one aspect of the invention provides a vibration driven motor wherein a rotor has a springy contact portion having an elasticity in the axial direction of a vibration member, and wherein the vibration member has a springy contact portion which is in contact with the contact portion of the rotor, and which has an elasticity in the radial direction of the vibration member.

Another aspect of the present invention provides a camera system employing the above-described vibration driven motor as a driving source.

In one aspect, the present invention relates to a vibration driven motor including a vibration member for generating a vibration therein as a driving force, the vibration member including an elastic contact portion, and a contact member in press contact with the vibration member, the contact member including an elastic contact portion in contact with the elastic contact portion of the vibration member, wherein a vibration generated in the vibration member creates relative movement between the vibration member and the contact member.

In another aspect, the present invention relates to a vibration wave driven motor including a contact member having an elastic contact portion, and a vibrating member having an elastic contact portion in press contact with the elastic contact portion of the contact member. An electromechanical energy conversion member generates at least two vibration waves having a phase difference in time and space therebetween in the vibrating member in response to an applied electrical signal, wherein a combined vibration of the two vibrations functions as a driving force for the motor.

In yet another aspect, the present invention relates to a vibration wave driven apparatus including a contact member including a contact portion having a spring characteristic, and a vibrating member including a contact portion having a spring characteristic in press contact with the contact portion of the contact member. An electromechanical energy conversion member generates at least two vibration waves having a phase difference in time and space therebetween in the vibrating member in response to an applied electrical signal, wherein a combined vibration of the two vibrations functions as a driving force for the apparatus.

Further objects, features and advantages of the present invention will become apparent from the following description of the preferred embodiments with reference to the attached drawings.

DESCRIPTION OF THE PREFERRED EMBODIMENTS

The preferred embodiments of the invention will be described hereinafter with reference to the drawings. The following description will mainly refer to the differences between these embodiments and conventional vibration driven motors.

Figure 1:
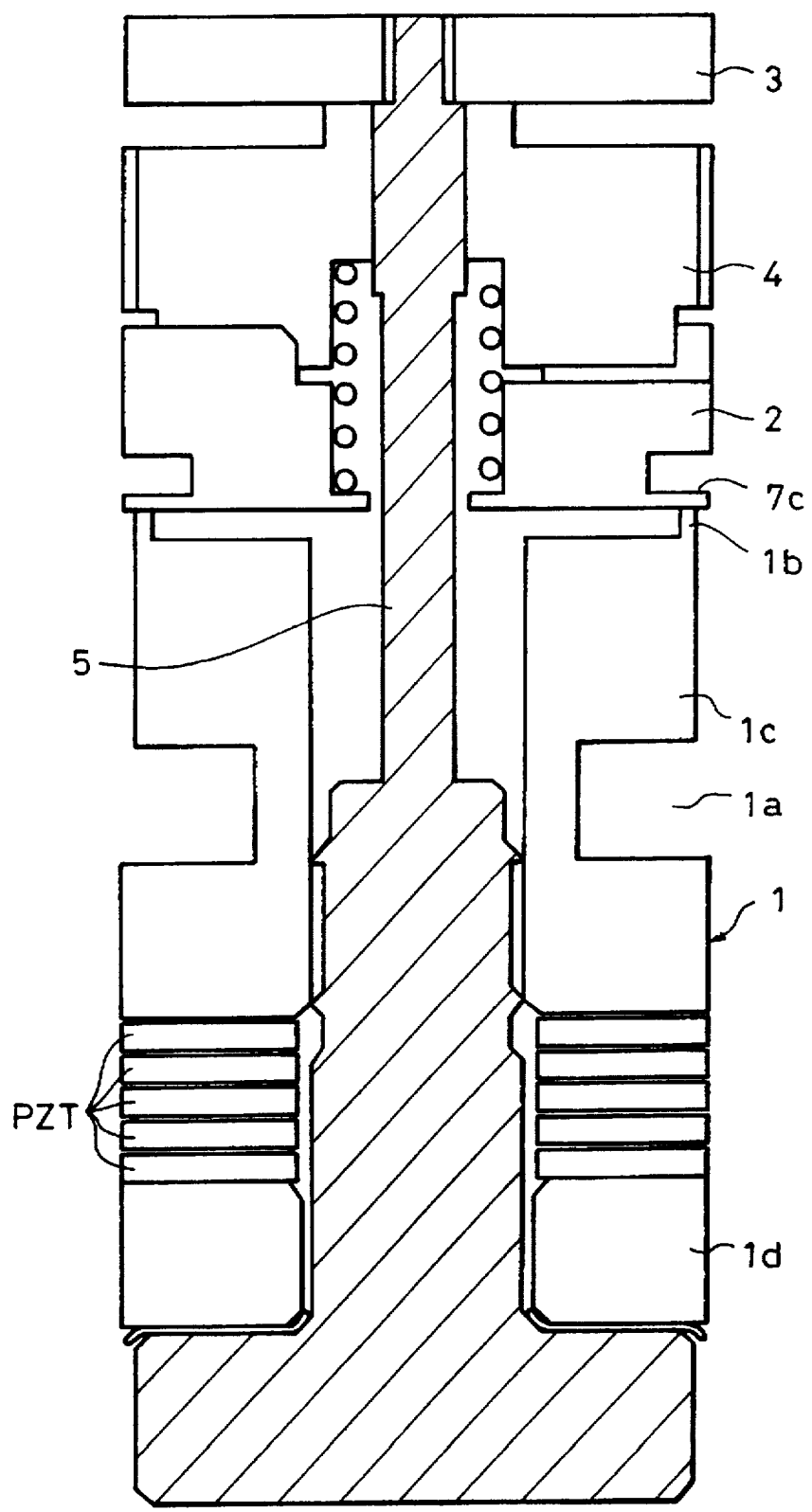
FIG. 1 illustrates a first embodiment of the vibration motor of the present invention.
Figure 2:
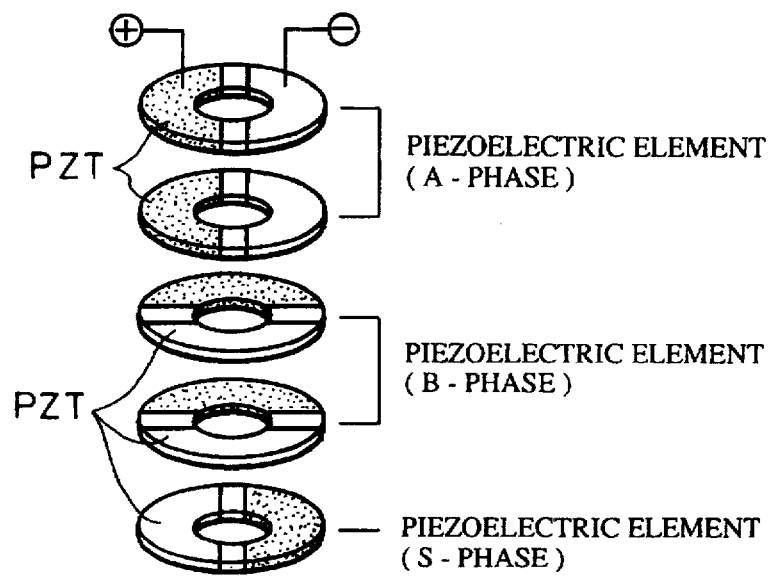
FIG. 2 is an exploded perspective view of piezoelectric elements, illustrating the polarization pattern thereof.
Figure 3:
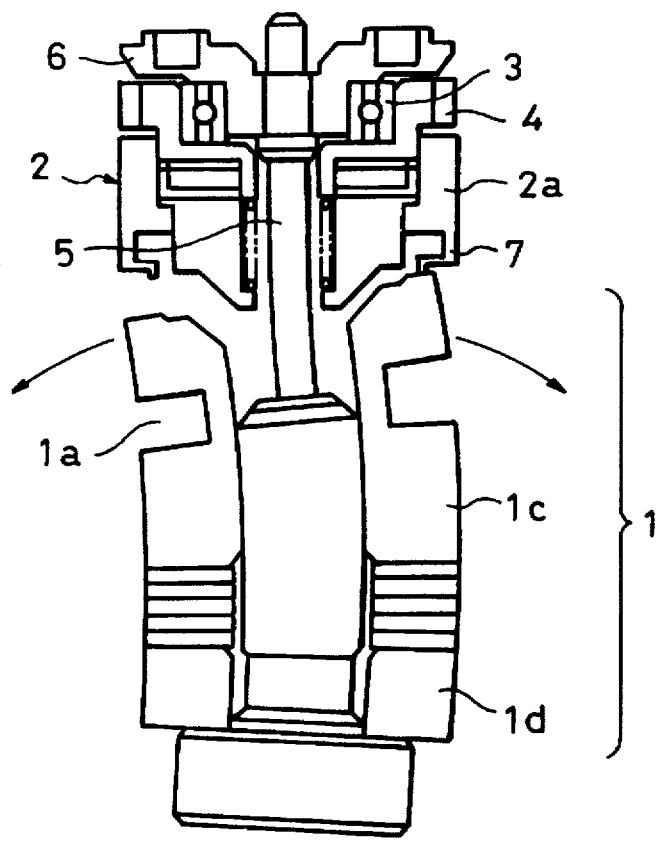
FIG. 3 illustrates a conventional vibration driven motor.
Figure 4:
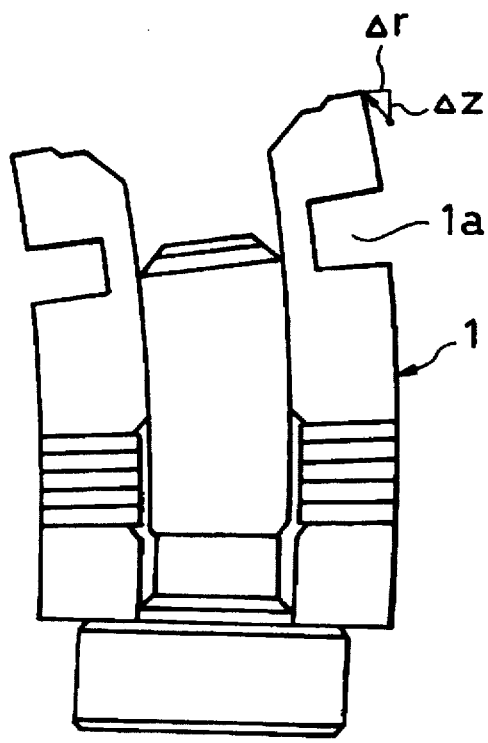
FIG. 4 illustrates the driving vibration mode of a bar-shaped vibration driven motor.
Figure 5:
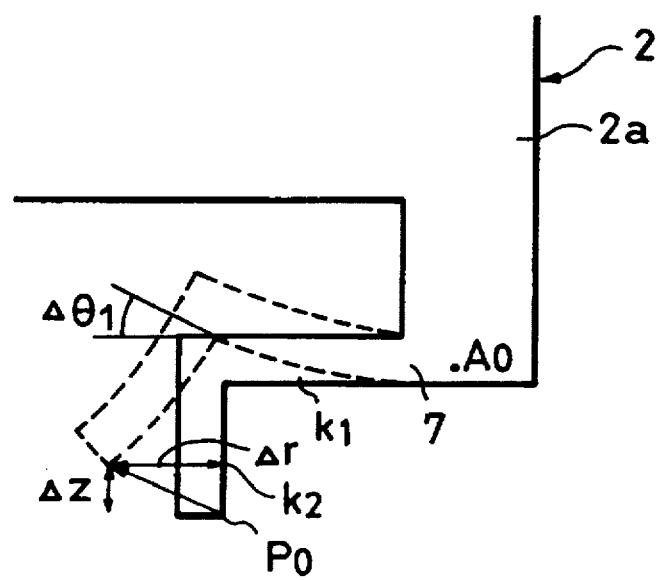
FIG. 5 illustrates the deformation of the contact spring of the rotor in a conventional vibration driven motor.
Figure 6:
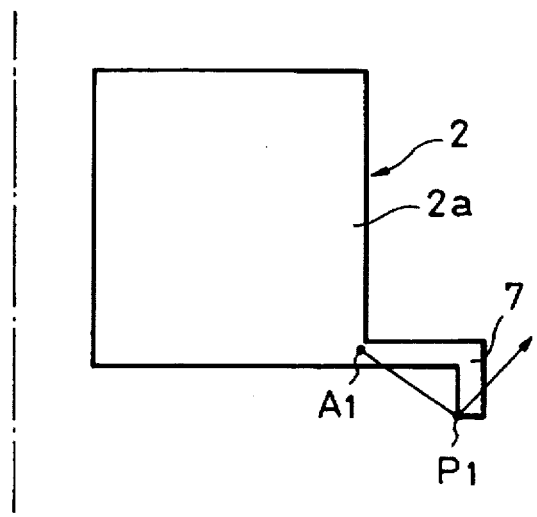
FIG. 6 illustrates a rotor of another conventional vibration driven motor.
Figure 7:
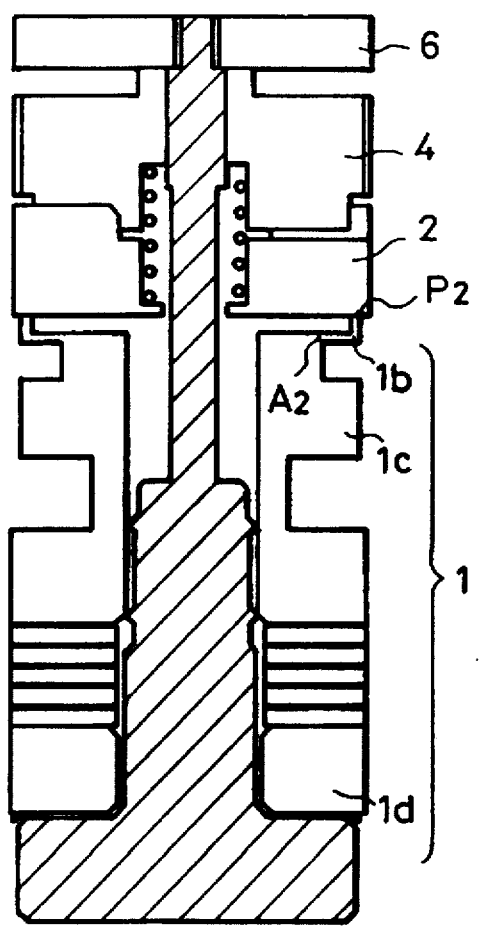
FIG. 7 is a sectional view of a conventional bar-shaped vibration driven motor.
Figure 8:
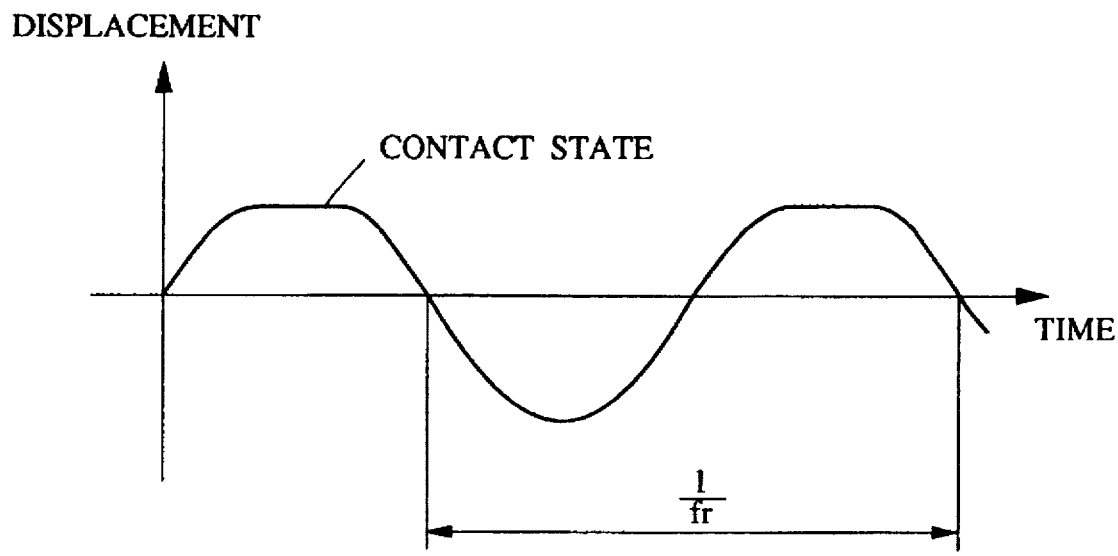
FIG. 8 is a graph indicating the contact state of a rotor of a conventional vibration driven motor.
Figure 9:
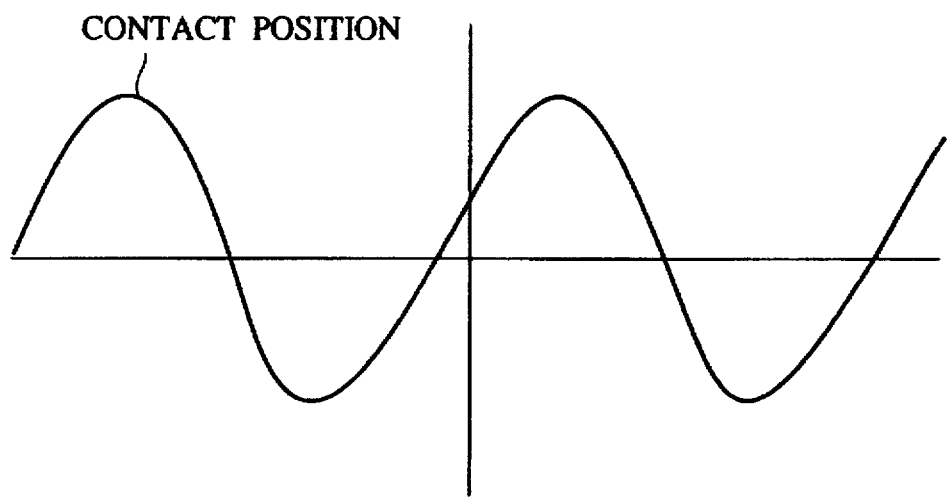
FIG. 9 is a graph indicating the actual measurement of the contact state.
Figure 10:
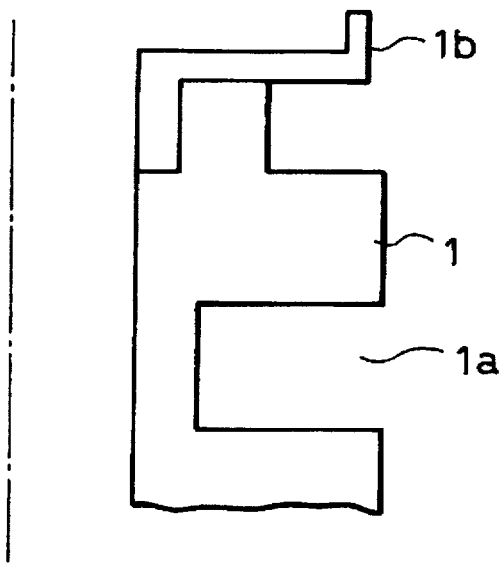
FIG. 10 illustrates a conventional construction of a vibration member in which a vibration member is connected to a contact spring.

Referring to FIG. 1, in the first embodiment, a hollow cylindrical vibration member 1 is made of brass and provided with an annular contact spring 1b formed along the circumference thereof. A rotor 2 is made of aluminum and provided with a flange-like spring 7c. The contact spring 1b has a large rigidity in an axial direction of the vibration member 1, and the spring 7c has a large rigidity in a radial direction of the vibration member 1. Therefore, the contact spring 1b and the contact spring 7c respectively and independently determine the radial and axial spring characteristics of the contact portion.

Because the axial length of the spring 1b and the radial length of the spring 7c can be reduced, the frequency responsiveness can be enhanced.

Because the springs 1b, 7c have simple shapes, they are easy to design and machine.

Figure 11:
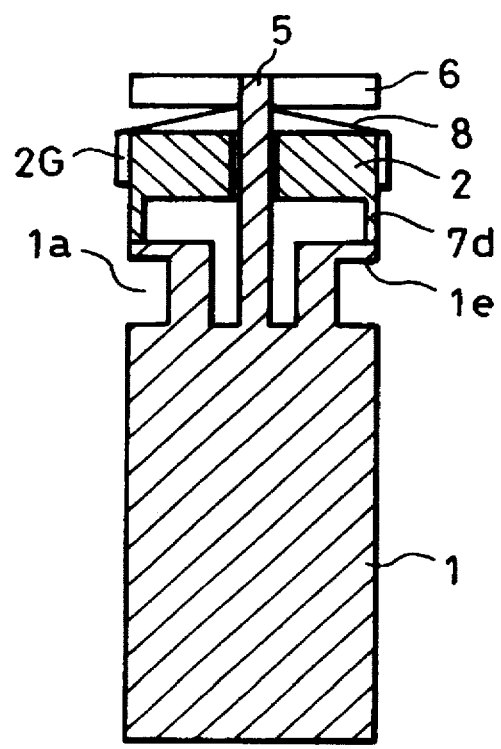
FIG. 11 illustrates a second embodiment of the vibration driven motor of the present invention.

A second embodiment will be described with reference to FIG. 11. In the second embodiment, a vibration member 1 has a spring 1e having an elasticity in an axial direction of the vibration member 1, and a rotor 2 has a spring 7d having an elasticity in a radial direction of the vibration member 1. The rotor 2 preferably is molded of resin, together with a gear 2G provided on a side thereof. The inner periphery of the rotor 2 is loosely but directly fitted on a supporting pin 5, thus forming a sliding bearing. The rotor 2 is urged onto the vibration member 1 by a cone-shaped disc spring 8.

The springs of this embodiment are provided in an arrangement opposite to the arrangement of the springs in the first embodiment. That is, the spring 1e of the vibration member 1 and the spring 7c of the rotor 2 in the second embodiment correspond in shape to the spring 7c of the rotor 2 and the spring 1b of the vibration member in the first embodiment, respectively. However, the second embodiment achieves generally the same advantages as achieved by the first embodiment.

Figure 12:
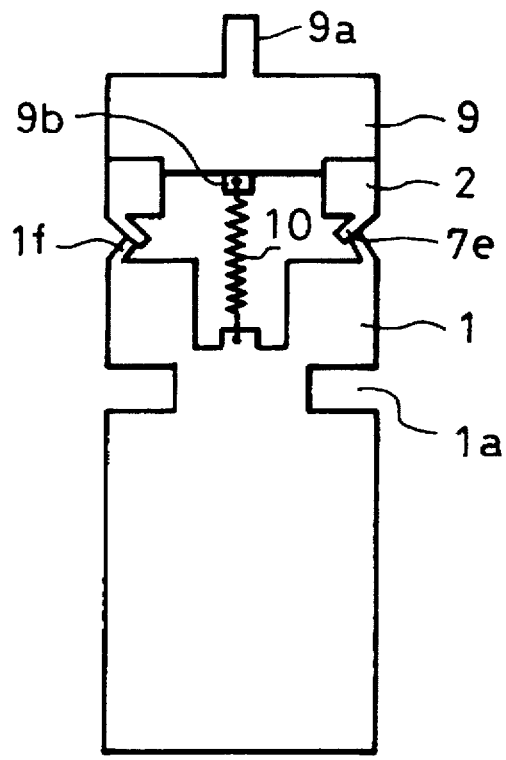
FIG. 12 illustrates a third embodiment of the vibration driven motor of the present invention.

The third embodiment will be described with reference to FIG. 12. The third embodiment comprises springs designed in accordance with the displacing directions of the driving vibration.

A vibration member has a flange-like spring 1f extending substantially in the direction of the displacement of the vibration member 1 in a plane including the axis of the vibration member 1. The spring 1f is rigid in the displacing direction and relatively soft or resilient in a direction perpendicular to the displacing direction.

A rotor 2 has a flange-like spring 7e extending substantially perpendicular to the flange-like spring 1f. Therefore, the spring 7e is relatively soft in the direction of the displacement of the vibration member 1 and rigid in the direction perpendicular to the displacement direction.

In this embodiment, because the displacement that the spring 1f of the vibration member 1 needs to follow is small, the resonance frequency can be substantially increased.

Furthermore, because the contact portion is inclined or tapered, the contact portion provides an aligning function.

The rotor 2 is fitted to a member 9 having a motor output shaft 9a. The member 9 is connected to the vibration member 1 by a coil spring 10, by which the vibration member 1 is urged onto the rotor 2. The coil spring 10 is connected to the member 9 by a bearing 9b, which allows the member 9 to rotate.

Figure 13:
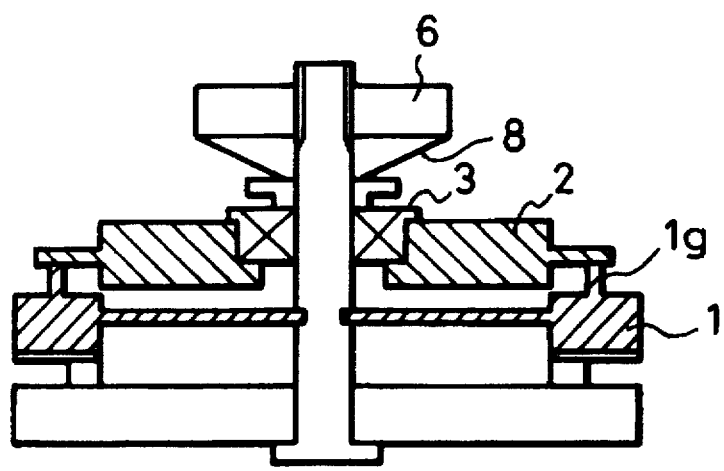
FIG. 13 illustrates a fourth embodiment of the vibration driven motor of the present invention.

FIG. 13 illustrates a fourth embodiment of the present invention in the form of a ring-shaped vibration driven motor. Similarly to the bar-shaped vibration member, a point on the surface of an annular vibration member 1 displaces both axially and radially during the planer bending vibration of the annular vibration member 1, and such radial displacement is unnecessary to a drive operation of the rotor. To prevent the radial displacement from causing slippage, the vibration member 1 is provided with a spring 1g.

The construction and operative principles as shown in FIG. 13 also can be applied to a linear motor, wherein the vibration member is formed in an elliptical shape having a linear portion onto which a member is pressed.

Figure 14A:
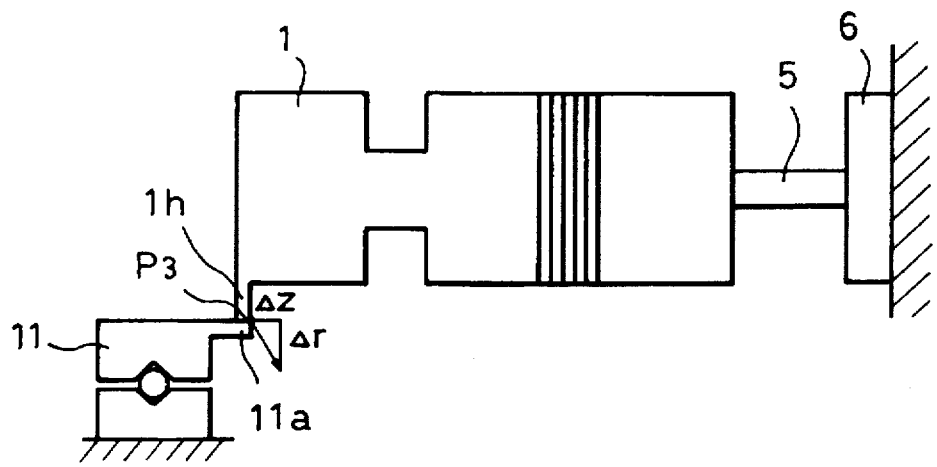
FIGS. 14(a) to 14(c) illustrate a fifth embodiment of the vibration driven motor of the present invention.
Figure 14B:
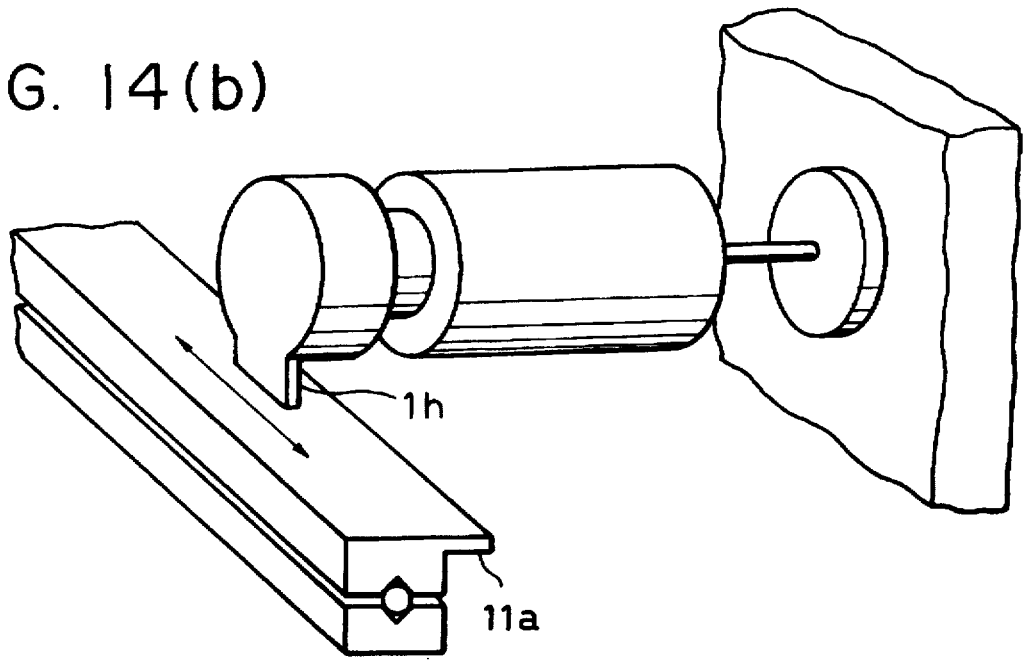
Figure 14C:
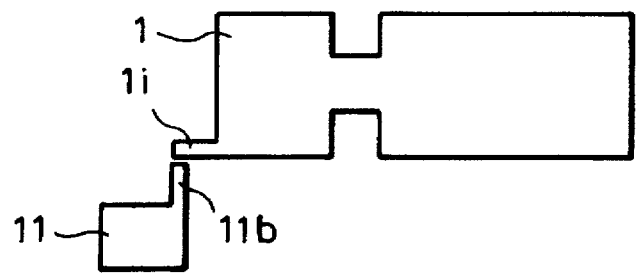

FIGS. 14(a) to 14(c) illustrate a fifth embodiment in which a bar-shaped vibration driven motor according to the present invention is applied to a linear motor. A vibration member 1 has a springy tip 1h radially extending from an end portion of the vibration member 1. The springy tip 1h is urged onto a springy edge portion 11a horizontally extending from a movable member 11 of a linear slider. Because the end portion of the vibration member 1 circularly oscillates, the springy tip 1h and the springy edge portion 11a achieve linear movement relative to each other, thereby linearly moving the movable member 11. Although the vibration member is described as being fixed to a fixing member in the embodiment of FIG. 14(b), the vibration member 1 may be fixed to a portion of a linear slider, for example, the movable member, thereby linearly moving the vibration member 1.

In this embodiment, a contact point $P_3$ is displaced in accordance with the combination of displacement components $\Delta r$ and $\Delta z$. The component $\Delta z$, which causes unnecessary slippage, is absorbed by the springy tip 1h of the vibration member 1. FIG. 14(c) illustrates a modification in which a movable member 11 is provided with a springy edge potion 11b for absorbing the displacement component $\Delta z$.

Figure 15:
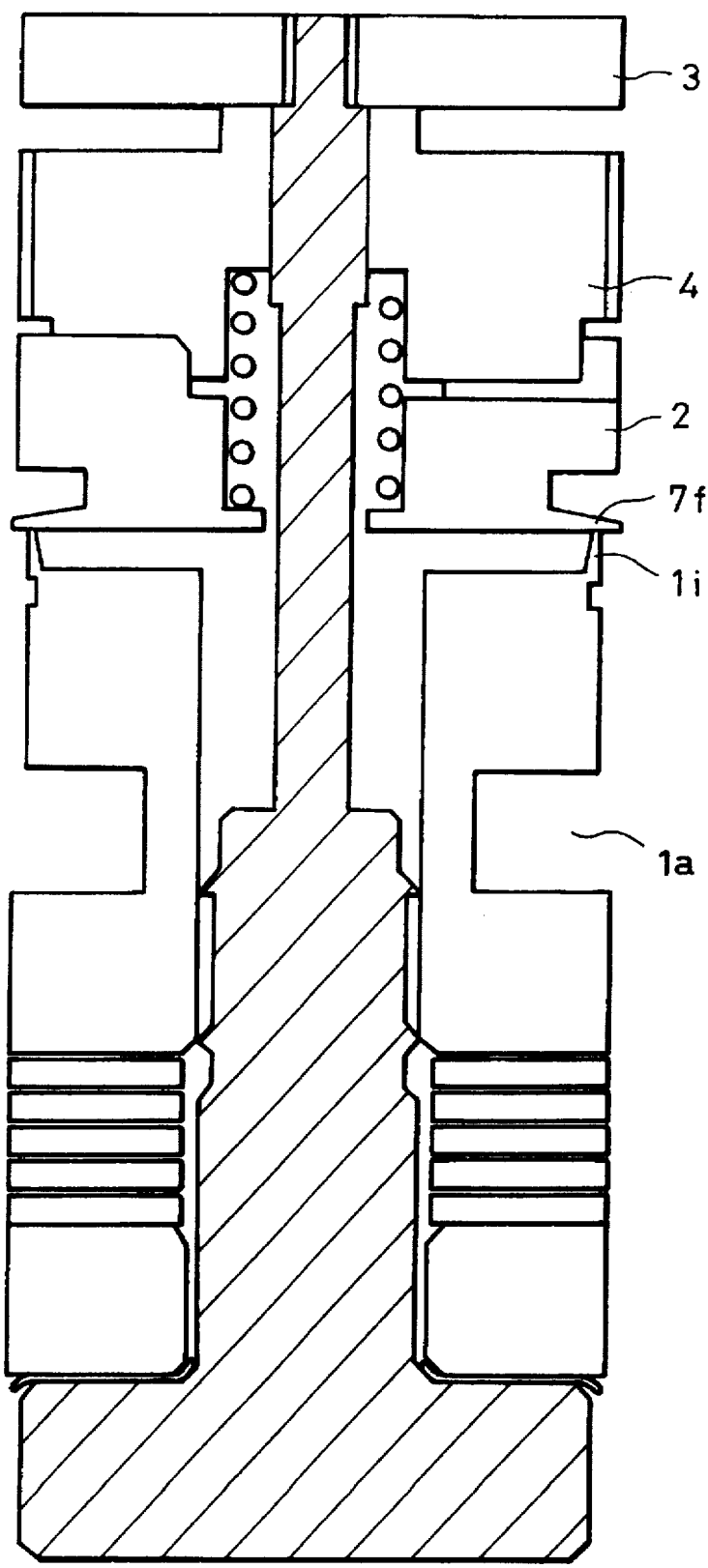
FIG. 15 illustrates a sixth embodiment of the vibration driven motor of the present invention.

FIG. 15 illustrates a sixth embodiment of the present invention, which is similar to the first embodiment shown in FIG. 1 but further improves the frequency responsiveness of the contact springs. Contact springs 1i and 7f of a vibration member 1 and a rotor 2, respectively, are tapered so as to become narrower toward the free ends thereof. Given the same static rigidities, the contact springs 1i, 7f achieve higher resonance frequency than the corresponding contact springs of the first embodiment.

Figure 16:
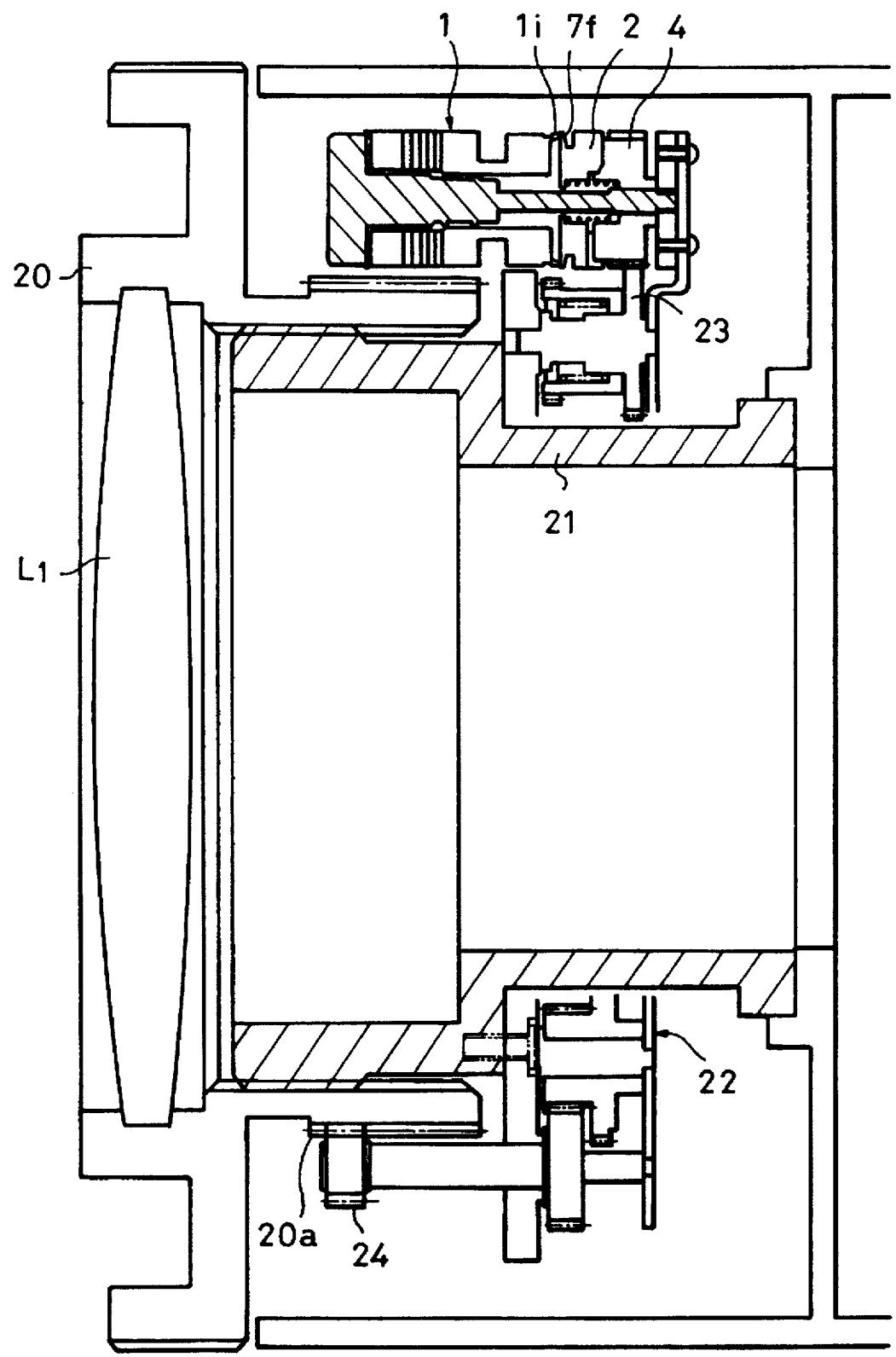
FIG. 16 is a sectional view of a lens barrel as an example of a system employing the vibration driven motor of the sixth embodiment as a driving source.

FIG. 16 illustrates another embodiment of the present invention in which the vibration driven motor of FIG. 15 is used as a driving motor for a lens barrel. The vibration driven motor and a speed reducing gear device 22 are connected to a fixed barrel 21 of the lens barrel. The output gear 4 of the vibration motor is engaged with the input gear 23 of the speed reducing gear device 22. The output gear 24 of the speed reducing gear device 22 is engaged with a gear portion 20a formed on the outer periphery of a lens supporting member 20. When the vibration driven motor is operated, the lens supporting member 20 is rotated about and moved along the optical axis by means of the speed reducing gear device 22, thus performing, for example, a focusing operation.

As described above, in the vibration driven motor of the present invention, the vibration member and the rotor (or movable member) achieve desirable contact therebetween, thus facilitating both size reduction and torque enhancement of a vibration driven motor.

Furthermore, because the vibration driven motor of the present invention comprises different contact springs for different functions, each contact spring can be designed to achieve the optimal springiness for its individual function, thereby facilitating the design of the motor and enhancing the motor efficiency.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A vibration driven motor comprising:

a vibration member for generating a vibration therein as a driving force, the vibration member including a body and a contact spring portion extending from the body of said vibration member and cantilevered in cross-section to provide a spring characteristic relative to the body of said vibration member, said contact spring portion of said vibration member being elastically deformable in a first direction; and a contact member in press contact with said vibration member, said contact member including a body and a contact spring portion extending from the body of said contact member and cantilevered in cross-section to provide a spring characteristic relative to the body of said contact member, the contact spring portion of said contact member being in contact with the contact spring portion of said vibration member, said contact spring portion of said contact member being elastically deformable in a second direction different from the first direction, such that said vibration generated in the vibration member creates relative movement between the vibration member and the contact member.

2. A vibration driven motor according to claim 1, wherein the contact portion of said vibration member is elastically displacable in a first direction, and the contact portion of said contact member is elastically displacable in a second direction different from the first direction.

3. A vibration driven motor according to claim 2, wherein the first direction and the second direction are substantially perpendicular to each other.

4. A vibration driven motor according to claim 1, wherein one of said contact portions is displacable in a radial direction of said vibration member and the other one of said contact portions is displacable in an axial direction of said vibration member.

5. A vibration driven motor according to claim 2, wherein one of said contact portions is displacable in a radial direction of said vibration member and the other one of said contact portions is displacable in an axial direction of said vibration member.

6. A vibration driven motor according to claim 3, wherein one of said contact portions is displacable in a radial direction of said vibration member and the other one of said contact portions is displacable in an axial direction of said vibration member.

7. A vibration driven motor according to claim 3, wherein the direction of displacement of one of said contact portions is substantially perpendicular to the direction of displacement of the other one of said contact portions in a plane including the axis of said vibration member and the displacement direction of the driving vibration.

8. A vibration driven motor according to any one of claims 1 to 7, wherein at least one of said contact portions has a sectional shape in which an end portion thereof is narrower that a base portion thereof, said sectional shape being taken in a plane including the axis of said vibration driven motor.

9. An apparatus employing as a driving source a vibration driven motor according to any one of claims 1 to 7.

10. An apparatus employing as a driving source a vibration driven motor according to claim 8.

11. A vibration driven motor according to claim 4, wherein the contact portion of said vibration member is displacable in an axial direction of said vibration member and the contact portion of said contact member is displacable in a radial direction of said vibration member.

12. An apparatus employing as a driving source a vibration driven motor according to claim 11.

13. A vibration wave driven motor comprising:

a contact member including a body and a contact spring portion extending from the body of said contact member and cantilevered in cross-section to provide a spring characteristic relative to the body of said contact member, said contact spring portion of said contact member being elastically deformable in a first direction;

a vibrating member including a body and a contact spring portion extending from the body of said vibrating member and cantilevered in cross-section to provide a spring characteristic relative to the body of said vibrating member, said contact spring portion of said vibrating member being elastically deformable in a second direction different from the first direction, the contact spring portion of said contact member being in contact with the contact spring portion of said vibrating member; and an electromechanical energy conversion member for generating at least two vibration waves having a phase difference in time and space therebetween in said vibrating member in response to an applied electrical signal, wherein a combined vibration of said two vibration waves generates a driving force for the motor.

14. A vibration wave driven apparatus comprising:

a contact member including a body and a contact spring portion extending from said body and cantilevered in cross-section to provide a spring characteristic relative to the body of said contact member, said contact spring portion of said contact member being elastically deformable in a first direction;

a vibrating member including a body and a contact spring portion extending from the body of said vibrating member and cantilevered in cross-section to provide a spring characteristic relative to the body of said vibrating member, said contact spring portion of said vibrating member being elastically deformable in a second direction different from the first direction, and arranged in press contact with the contact spring portion of said contact member; and an electromechanical energy conversion member for generating at least two vibration waves having a phase difference in time and space therebetween in said vibrating member in response to an applied electrical signal, wherein a combined vibration of said two vibration waves generates a driving force for the apparatus.

* * * * *

UNITED STATES PATENT AND TRADEMARK OFFICE
CERTIFICATE OF CORRECTION

PATENT NO. : 5,646,469
DATED : July 8, 1997
INVENTOR(S) : TAKAYUKI TSUKIMOTO, ET AL.

It is certified that error appears in the above-identified patent and that said Letters Patent is hereby corrected as shown below:

On the title page: Item

At [56] References Cited

"Kurakami" should read --Murakami--.

Column 8

Line 25, "that" should read --than--.

Signed and Sealed this

Third Day of February, 1998

Attest:

BRUCE LEHMAN

Attesting Officer

Commissioner of Patents and Trademarks